(12) United States Patent
Drucker

(10) Patent No.: US 6,766,982 B2
(45) Date of Patent: Jul. 27, 2004

(54) AIRSHIP AND BERTHING PORT

(76) Inventor: Ernest Robert Drucker, Suite 1905, 135, Marlee Ave., Toronto, Ontario (CA), M6B 4C6

(*) Notice: Subject to any disclaimer, the term of this patent is extended or adjusted under 35 U.S.C. 154(b) by 0 days.

(21) Appl. No.: 10/650,854

(22) Filed: Aug. 29, 2003

(65) Prior Publication Data

US 2004/0075021 A1 Apr. 22, 2004

Related U.S. Application Data

(60) Provisional application No. 60/406,962, filed on Aug. 30, 2002.

(51) Int. Cl.[7] ............................................. B64B 1/02
(52) U.S. Cl. ............................. 244/96; 244/125; 244/30
(58) Field of Search ............................ 244/96, 125, 24, 244/30, 25

(56) References Cited

U.S. PATENT DOCUMENTS

| | | | |
|---|---|---|---|
| 1,144,177 A | 6/1915 | Dodman | |
| 4,166,596 A | 9/1979 | Mouton, Jr. | 244/30 |
| 4,967,983 A * | 11/1990 | Motts | 244/30 |
| 5,071,090 A | 12/1991 | Takahashi | 244/29 |
| 5,110,070 A | 5/1992 | Hagenlocher | 244/125 |
| 5,431,359 A | 7/1995 | Belie | 244/116 |
| 5,449,129 A | 9/1995 | Carlile | 244/26 |
| 5,906,335 A * | 5/1999 | Thompson | 244/96 |
| 6,019,312 A * | 2/2000 | Blenn | 244/51 |
| 6,231,007 B1 | 5/2001 | Schafer | 244/127 |
| 6,311,925 B1 | 11/2001 | Rist | 244/30 |
| 6,581,873 B2 * | 6/2003 | McDermott | 244/25 |

\* cited by examiner

Primary Examiner—J. Woodrow Eldred

(57) ABSTRACT

An airship comprises a fuselage and a supporting structure positioned within the fuselage. An air passageway extends through the fuselage in an axial direction, with this air passageway having air inlet openings at the forward end of the airship with a first passageway tapering inwardly to provide a venturi in a mid region of the airship. A second passageway downstream of the venturi continues to the rear end of the airship where it flow-connects to a variable pitch rearwardly projecting air nozzle. An air turbine is mounted in the narrowest region of the venturi and is adapted to generate electricity. A plurality of adjustable air wings project outwardly from the surface of the fuselage, these air wings being arranged in circumferential rows. Cargo areas are provided at the bottom of the fuselage. A unique berthing post is used with the airship.

8 Claims, 4 Drawing Sheets

AIRSHIP AND BERTHING PORT

CROSS-REFERENCE TO RELATED APPLICATION

This application claims the benefit of Provisional U.S. Application Serial No. 60/406,962, filed Aug. 30, 2002.

BACKGROUND OF THE INVENTION

This invention relates to an airship with an internal power turbine and a berthing port for use with the airship.

In recent years there has been renewed interest in airships for the transportation of passengers and cargo. An airship does not require a large runway, is free from the noise pollution of a jet airport and is energy efficient. In U.S. Pat. No. 5,071,090, issued Dec. 10, 1991, an airship having improved controllability is described. It includes an axial fluid pathway extending axially throughout the airship and radial pathways connecting with the axial pathway. The propulsion system is mounted within the axial pathway and the radial pathways provide for lateral thrust to control lateral movement of the airship.

A tethered airship carrying wind turbines to generate electricity is described in U.S. Pat. No. 4,166,596, issued Sep. 4, 1979. That airship includes an axial passageway in the form of a venturi with a wind turbine mounted in the narrowest part of the venturi. In this design the energy from the turbine is transferred to the ground.

In U.S. Pat. No. 6,231,007, issued May 15, 2001, a method is described for the precise setting down or picking up of cargo from airships. In this method, the airship is moored to a mast and a rope framework is set up between the airship and the ground for controlled loading and unloading. Cargo containers are moved between the airship and the ground by means of winches and ropes or cables.

A docking system for airships is described in U.S. Pat. No. 5,431,359, issued Jul. 11, 1995. The airship includes a cargo carrying structure mounted to the bottom of the airship and extending lengthwise along the length of the airship. The cargo carrying structure has a plurality of open ended lateral passageways for carrying cargo. For loading and unloading, the airship is moored to a mast with the cargo carrying structure in contact with a loading and unloading platform which is rotatable to stay in alignment with the airship. A transportation system removes cargo from one side of the lateral passageways and adds cargo from the other side of the passageways.

It is an object of the present invention to provide an improved airship with good handling characteristics and with the capability of generating electricity.

It is a further object of the invention to provide a unique berthing port for use with the airship.

SUMMARY OF THE INVENTION

The airship of this invention comprises a fuselage and a supporting structure positioned within the fuselage. An air passageway extends through the fuselage in an axial direction, with this air passageway having air inlet openings at the forward end of the airship with a first passageway tapering inwardly to provide a venturi in a mid region of the airship. A second passageway downstream of the venturi continues to the rear end of the airship where it flow-connects to a variable pitch rearwardly projecting air nozzle. An air turbine is mounted in the narrowest region of the venturi and is adapted to generate electricity. A plurality of adjustable air wings project outwardly from the surface of the fuselage, these air wings being arranged in circumferential rows. Cargo areas are provided at the bottom of the fuselage.

Motors and propellers are preferably mounted externally of the fuselage to provide auxiliary propulsion and to assist in docking procedures.

The design of this airship is intended to take maximum advantage of prevailing westerly winds, i.e. the airship is carried from west to east by the winds. The affect of the winds on the airship is considerably enhanced by the use of the adjustable air wings. These air wings project outwardly from the surface of the fuselage and are arranged in several circumferential rows.

As the airship moves forward, air currents are directed through the internal passageway and through the venturi where the air currents are used to drive the air turbines to generate electricity. This electricity can be used for the cooling of cargo areas, charging storage batteries, operating other components of the airship, etc.

The variable pitch air discharge nozzle at the rear end of the aircraft is used in the manner of a combined elevator, rudder for the airship.

The airship of this invention is intended to be used in combination with a special design of berthing port within which the airship rests. A series of winches are mounted in a lower region of the airship and ropes or cables connect between the winches and the berthing port. Once the airship is aligned with the berthing port, it is winched down so that it may interconnect with a loading/unloading platform.

To assist in the alignment of the airship with the berthing port, electromagnetic lines extend longitudinally in a lower region of the airship and further electromagnetic lines are positioned within the bottom of the berthing port. By activating these electromagnetic lines, the airship is aligned with the berthing port platform.

BRIEF DESCRIPTION OF THE DRAWINGS

In the drawings which illustrate this invention.

DESCRIPTION OF THE PREFERRED EMBODIMENTS

Figure 1:
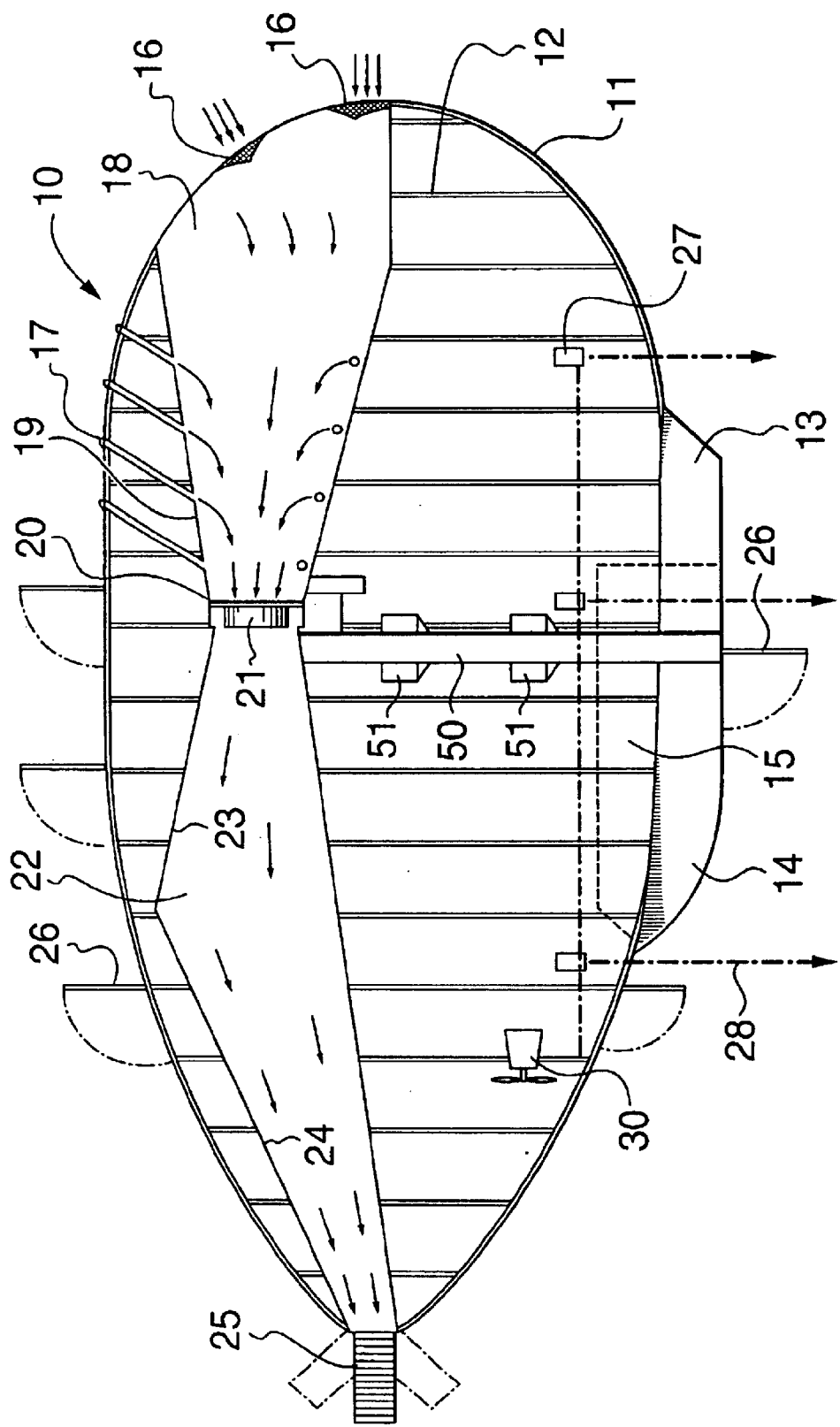
FIG. 1 is a schematic elevation view of an airship according to the invention.
Figure 2:
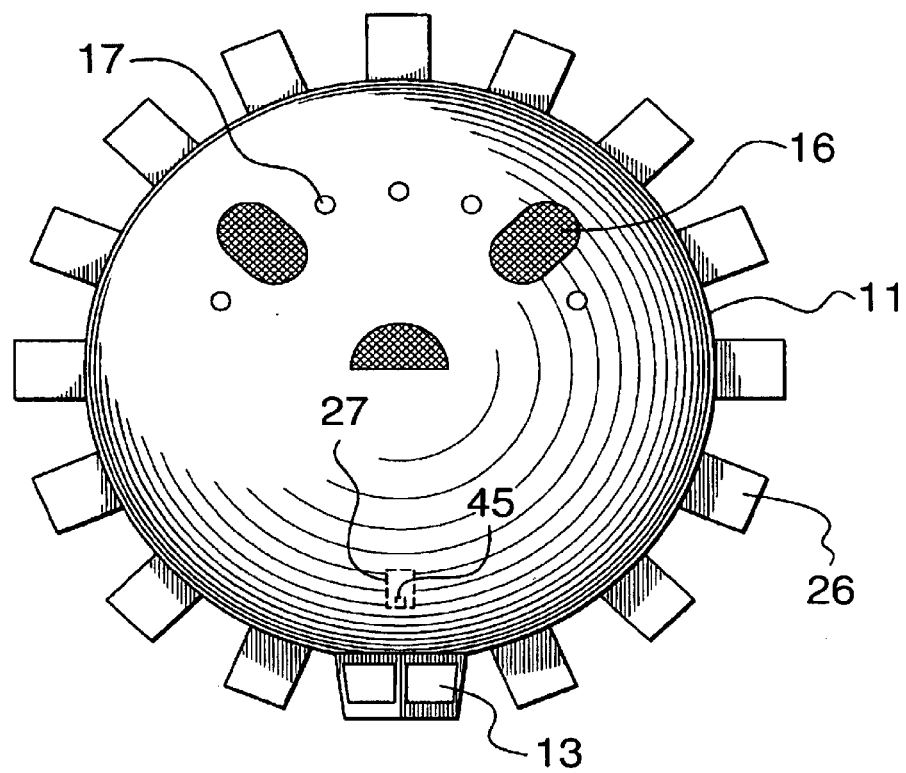
FIG. 2 is a schematic and elevation of the airship of FIG. 1.

As shown in FIGS. 1 and 2, an airship 10 has an outer shell 11 and an inner structural frame 12. Fixed to the bottom of the airship are an operational cockpit 13 and a cargo or passenger area 14. A further cargo area 15 may be provided within the airship fuselage itself.

Air intakes 16 in an upper front region of the airship feed air into a passageway 18 having converging walls 19 to form a narrow throat or venturi 20. Further air inlets 17 and ducts may also be provided into passageway 18. Mounted within the venturi 20 is an air turbine 21 which is connected to a generator for the generation of electricity. Air from the turbine discharges into a downstream air passageway 22 having first diverging sidewalls 23 and then converging sidewalls 24 terminating in a projecting tiltable air nozzle 25. This nozzle can be tilted up and down and side to side to act as an elevator or rudder for the airship. The airship also includes rudders 29.

Additional air inlet ducts similar to inlet ducts 17 may also be provided to direct air from sides of the fuselage into passageway 22. This is of value particularly when the airship is not moving in a west to east direction.

Figure 3:
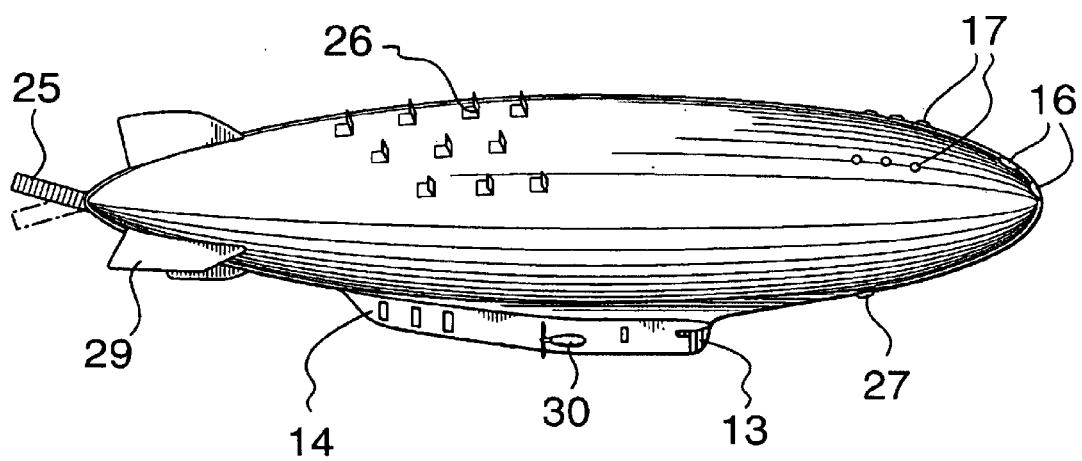
FIG. 3 is a side elevation of an alternative embodiment of the airship.

A series of adjustable air wings 26 are mounted on the external face of the fuselage. As can be seen from FIGS. 2 and 3, these air wings are arranged in circumferential rows. Electric motors (not shown) are used for tilting the air wings at any point between full open positions as shown and fully retracted positions. For stability it is important to have at least two air wings in open position at the same time, e.g. an air wing at the top of the fuselage and an air wing at the bottom.

The portions of the fuselage other than the passageway 18 are filled with a buoyant gas, such as helium. The quantity of helium should be sufficient to provide a lifting power at least 20% greater than the total weight of the airship, including the cargo.

An elevator shaft 50 with an elevator is located in a central region of the airship. This provides access to the air turbines 21. A plurality of batteries 51 are arranged along the elevator shaft with access from the elevator. These are used for flying in northern and southern directions and can be charged by energy generated by the airship itself as well as during berthing.

The airship also includes a series of winches 27 to which are connected downwardly dropping ropes or cables 28. These are used for connecting to a berthing port described hereinafter.

As can be seen from FIG. 1, motor driven propellers 30 are mounted on the fuselage.

Figure 4:
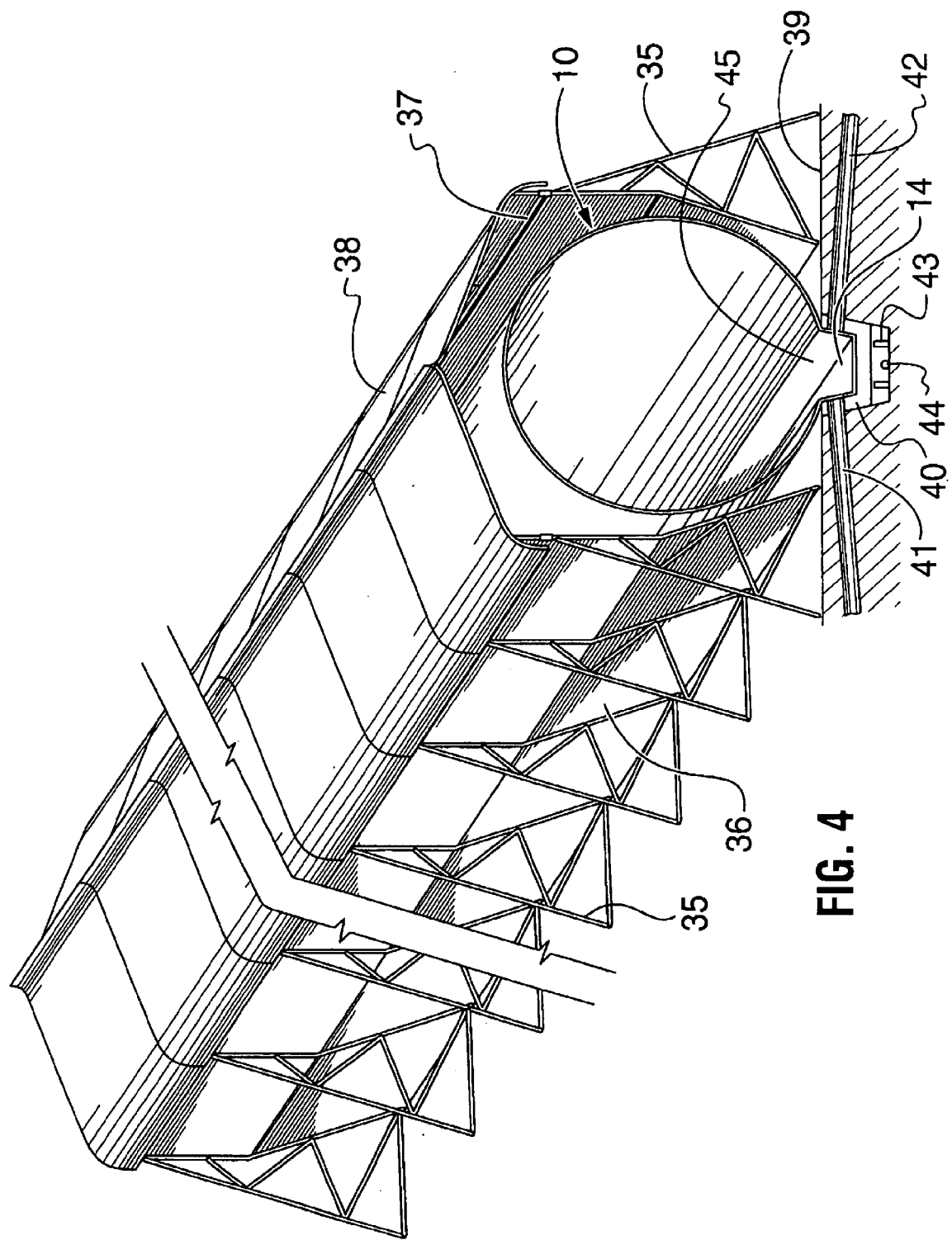
FIG. 4 is a perspective view of a berthing port.
Figure 5:
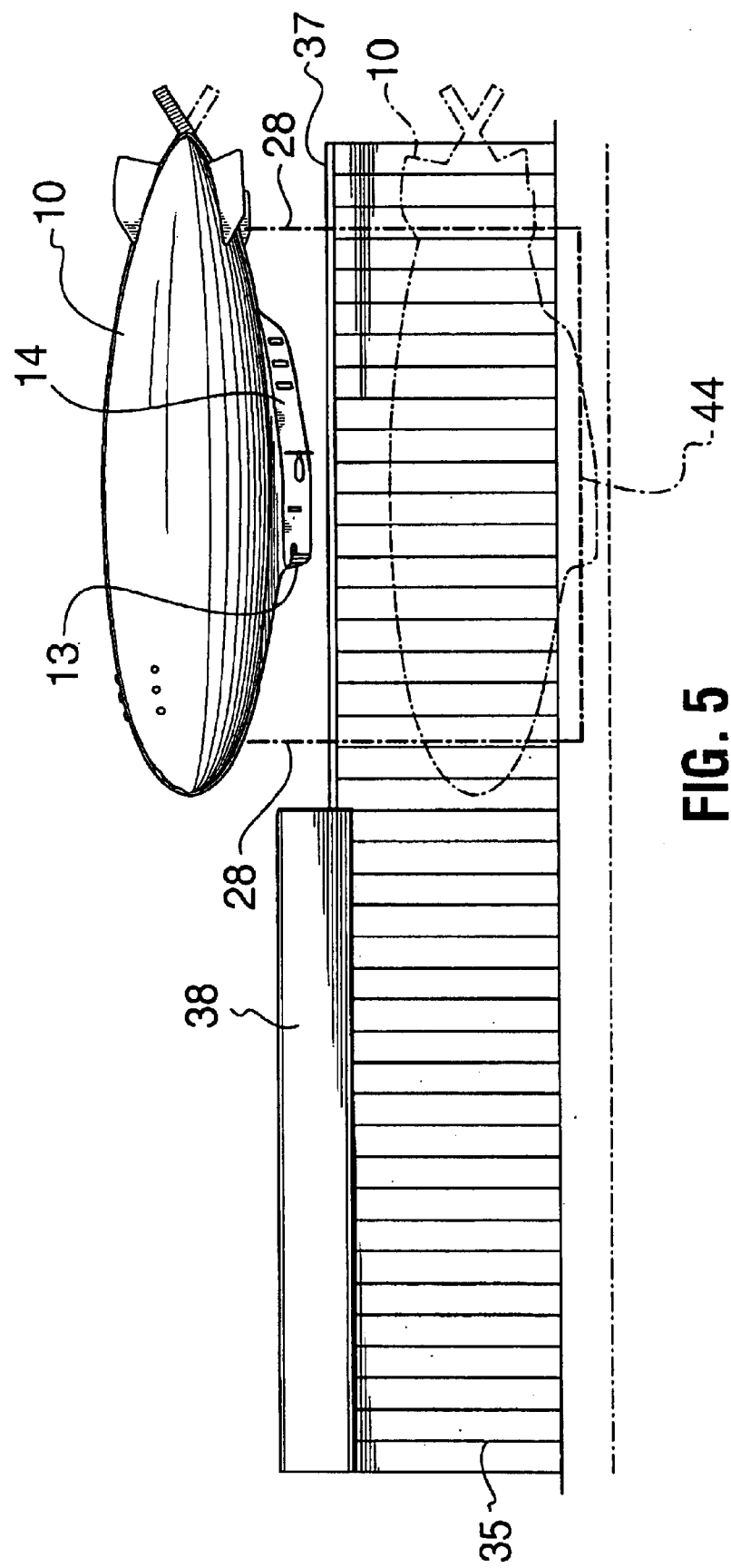
FIG. 5 is a side elevation of the berthing port of FIG. 3.

The berthing port is described in some detail in FIGS. 4 and 5. The port is constructed with an external support frame 35 which supports side walls 36 and top edge tracks 37. Mounted on these tracks 37 is a moveable roof 38. This roof 38 rolls back and forth along the tracks 37 providing an open top area for receiving an airship 10.

The base 39 of the berthing port has an open tunnel 40 adapted to receive the cargo and cockpit region of the airship. Extending outwardly from this central tunnel are lateral tunnels 41 and 42 for loading and unloading cargo. Also located below the tunnel 40 are further winches 43.

In order to dock an airship, it is moved into position over the berthing port and cables are connected between the berthing port and airship via winches 27 on the airship and winches 43 in the berthing port.

A longitudinal electromagnetic line 44 is mounted within the bottom of the berthing port and a further electromagnetic line 45 extends along the length of the airship. During berthing, these electromagnetic lines are activated and serve to pull the airship into alignment within the open tunnel 40 for final docking. Once the airship has been firmly docked in position resting within the open tunnel 40, the roof 38 is closed.

At this point, loading, unloading, servicing, etc. of the airship can take place within the confines of the closed berthing port.

What is claimed is:

1. An airship comprising a fuselage, a supporting structure positioned internal to the fuselage, an air passageway extending through the fuselage in an axial direction, said air passageway having air inlet openings at the forward end of the airship with the passageway tapering inwardly to provide a venturi in a mid region of the airship and the passageway downstream of the venturi continuing to the rear end of the airship where it flow connects to a variable pitch rearwardly projecting nozzle, and an air turbine mounted in the narrowest region of the venturi and adapted to generate electricity, a plurality of adjustable air wings projecting outwardly from the surface of the fuselage said air wings being arranged in circumferential rows and cargo areas at the bottom of the fuselage.

2. An airship according to claim 1 which includes motors and propellers mounted externally on the fuselage.

3. An airship according to claim 2 which includes fixed rudders on a rear portion of the fuselage.

4. An airship according to claim 3 wherein the adjustable air wings are connected to electric motors for adjusting.

5. An airship according to claim 1 which includes winches at the bottom of the fuselage with ropes or cables for connecting the airship to a berthing port.

6. An airship according to claim 5 which includes a longitudinally extending electromagnetic line adapted to cooperate with a corresponding electromagnetic line in the berthing port.

7. An airship according to claim 6 in combination with a berthing port for receiving the airship, said berthing port comprising externally supported side walls, a horizontally slideable roof supported on the walls and a floor structure, said floor structure including a longitudinal cavity for receiving the cargo area of the airship, and tunnels extending laterally from the longitudinal cavity for loading and unloading cargo.

8. The combination of claim 7 which includes a longitudinally extending electromagnetic line located below said longitudinal cavity and adapted to cooperate with said airship electromagnetic line to direct the airship into the berthing port.

* * * * *